United States Patent
Morita et al.

(10) Patent No.: US 7,627,905 B2
(45) Date of Patent: Dec. 1, 2009

(54) CONTENT TRANSFER SYSTEM, CONTENT TRANSFER METHOD, CONTENT TRANSMITTING APPARATUS, CONTENT TRANSMISSION METHOD, CONTENT RECEIVING APPARATUS, CONTENT RECEPTION METHOD, AND COMPUTER PROGRAM

(75) Inventors: Takao Morita, Kanagawa (JP); Yukihiko Aoki, Tokyo (JP); Shinichi Kawano, Kanagawa (JP)

(73) Assignee: Sony Corporation, Tokyo (JP)

( * ) Notice: Subject to any disclaimer, the term of this patent is extended or adjusted under 35 U.S.C. 154(b) by 856 days.

(21) Appl. No.: 11/092,897

(22) Filed: Mar. 30, 2005

(65) Prior Publication Data

US 2005/0257056 A1 Nov. 17, 2005

(30) Foreign Application Priority Data

Apr. 7, 2004 (JP) ............................. 2004-113459

(51) Int. Cl.
G06F 7/04 (2006.01)
(52) U.S. Cl. ...................................................... 726/29
(58) Field of Classification Search .................. 726/29; 380/200; 725/86, 91
See application file for complete search history.

(56) References Cited

U.S. PATENT DOCUMENTS

2004/0030902 A1* 2/2004 Asano et al. ................. 713/176
2004/0123109 A1* 6/2004 Choi ............................ 713/176
2006/0112272 A1* 5/2006 Morioka et al. ............. 713/171

FOREIGN PATENT DOCUMENTS

JP 2003-122724 4/2003

OTHER PUBLICATIONS

Digital Transmission Conent Protection Specification vol. 1 (Information Version) Hitachi, Ltd Intel Corporation Matsushita Electric Industrial Co. Ltd. Sony Corporation Toshiba Corporation Revision 1.3 Nov. 24, 2003 Published via the Internet at DTCP.com.*
DTC [vol. 1 Supplement E Mapping DTCP to IP (Information Version) Hitachi, Ltd Intel Corporation Matsushita Electric Industrial Co. Ltd. Sony Corporation Toshiba Corporation Revision 1.0 Nov. 24, 2003 Published via the Internet at DTCP.com.*

(Continued)

*Primary Examiner*—Ellen Tran
(74) *Attorney, Agent, or Firm*—Oblon, Spivak, McClelland, Maier & Neustadt, L.L.P.

(57) ABSTRACT

The present invention provides a content transfer system for transferring content from a content transmitting apparatus to a content receiving apparatus through a network in consideration of content protection. The system comprises an authentication process executing means which executes an authentication process between the content transmitting apparatus and the content receiving apparatus to share authentication information therebetween, and a content transfer process executing means which encrypts content to be transferred in response to a content request from the content receiving apparatus to transfer the encrypted content from the content transmitting apparatus to the content receiving apparatus. A transfer process of the encrypted content is started on confirmation that the content request contains a keyword indicating that the content receiving apparatus has been authenticated. The keyword is of a check level that the content transmitting apparatus supports among keywords in a plurality of check levels representing accuracy of authentication check.

49 Claims, 11 Drawing Sheets

OTHER PUBLICATIONS

Takashi Kokubo, et al.,"Contents protection of the AV network ", Toshiba review, Toshiba Corporation, Jun. 1, 2003, Vol. 58., No. 6, pp. 36-39 (plus two cover pages), (Patent Office CSDB number: Company technical report 2004-00155-009).

* cited by examiner

FIG.3

GET http://server/content?X-DTCP-AUTH-ENDED=*true* HTTP/1.0¥r¥n
¥r¥n

FIG.4

GET http://server/content HTTP/1.0¥r¥n
X-DTCP-AUTH-ENDED: *true*¥r¥n
¥r¥n

FIG.5

GET http://server/content?X-DTCP-AUTH-INFO=*XXX* HTTP/1.0¥r¥n
¥r¥n

FIG.6

GET http://server/content HTTP/1.0¥r¥n
X-DTCP-AUTH-INFO: *XXX*¥r¥n
¥r¥n

FIG.7

LEVEL 2 KEYWORD VALUE ="AKE_label"+"MESSAGE DIGEST OF DTCP_Sink DEVICE ID"

FIG.8

```
GET http://server/content?X-DTCP-DIGEST-MD5=YYY HTTP/1.0¥r¥n
¥r¥n
```

FIG.9

```
GET http://server/content HTTP/1.0¥r¥n
X-DTCP-DIGEST-MD5: YYY¥r¥n
¥r¥n
```

FIG.10

```
GET http://server/content?X-DTCP-DIGEST-SHA-1=ZZZ HTTP/1.0¥r¥n
¥r¥n
```

FIG.11

```
GET http://server/content HTTP/1.0¥r¥n
X-DTCP-DIGEST-SHA-1: YYY¥r¥n
¥r¥n
```

FIG.12

```
GET http://server/content HTTP/1.0¥r¥n
Authorization: Digest
        username="DEVICE_ID",
        realm="...",
        nonce="...",
        uri="...",
        algorithm=...,
        response="SECRET_PARAM_INCLUDED_AS_PASSWORD",
        qop=...,
        nc=...,
        cnonce="..."¥r¥n
X-DTCP-AUTH-HTTP: true¥r¥n
¥r¥n
```

FIG.13

```
GET http://server/content HTTP/1.0¥r¥n
X-DTCP-DIGEST-MD5: YYY¥r¥n
X-DTCP-DIGEST-SHA-1: ZZZ¥r¥n
¥r¥n
```

FIG.14

```
HTTP/1.0 400 DTCP-IP Authentication Required¥r¥n
X-DTCP-AUTH-LEVEL: 1, 2, 4¥r¥n
¥r¥n
```

FIG.15

```
HTTP/1.0 400 DTCP-IP Authentication Required¥r¥n
X-DTCP-AUTH-ENDED: ¥r¥n
X-DTCP-AUTH-INFO: ¥r¥n
X-DTCP-DIGEST-MD5: ¥r¥n
¥r¥n
```

FIG.16

```
HTTP/1.1 401 DTCP-IP Authentication Required¥r¥n
WWW-Authenticate: Digest
           realm="...",
           nonce="...",
           algorithm="...",
           qop="..."¥r¥n
Connection: close¥r¥n
X-DTCP-AUTH-LEVEL: 1, 2, 4, 5¥r¥n
¥r¥n
```

FIG.17

```
HTTP/1.0 401 DTCP-IP Authentication Required¥r¥n
WWW-Authenticate: Digest
            realm="...",
            nonce="...",
            algorithm="...",
            qop="..."¥r¥n
X-DTCP-AUTH-ENDED: ¥r¥n
X-DTCP-AUTH-INFO: ¥r¥n
X-DTCP-DIGEST-SHA-1: ¥r¥n
X-DTCP-AUTH-HTTP: ¥r¥n
¥r¥n
```

FIG.20

Get /takao/test/ HTTP/1.1
Host: culver.sm.sony.co.jp:8080
User-Agent: Mozilla/5.0 (Windows; U; Windows NT 5.0; en-US; rv:1.6) Gecko/20040206 Firefox/0.8
Accept: application/x-shockwave-flash,text/xml,application/xml,application/xhtml+xml,text/html;q=0.9,text/plain;q=0.8,video/x-mng,image/png,image/jpeg,image/gif;q=0.2,*/*;q=0.1
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive

FIG.21

HTTP/1.1 401 Authorization Required
Date: Tue, 16 Mar 2004 11:48:32 GMT
Server: Apache/2.0.48 (Unix)
WWW-Authenticate: Digest realm="digest",
nonce="CihtLb7VAwA=ed6e0900bd0a44f32acb6f2acc128903117aa3d5", algorithm=MD5,
qop="auth"
Content-Length: 489
Keep-Alive: timeout=15, max=100
Connection: Keep-Alive
Content-Type: text/html; charset=iso-8859-1

<!DOCTYPE HTML PUBLIC "-//IETF//DTD HTML 2.0//EN">
<html><head>
<title>401 Authorization Required</title>
</head><body>
<h1>Authorization Required</h1>
<p>This server could not verify that you
are authorized to access the document
requested. Either you supplied the wrong
credentials (e.g., bad password), or your
browser doesn't understand how to supply
the credentials required.</p>
<hr />
<address>Apache/2.0.48 (Unix) Server at culver.sm.sony.co.jp Port 8080</address>
</body></html>

FIG.22

GET /takao/test/ HTTP/1.1
Host: culver.sm.sony.co.jp:8080
User-Agent: Mozilla/5.0 (Windows; U; Windows NT 5.0; en-US; rv:1.6) Gecko/20040206 Firefox/0.8
Accept: application/x-shockwave-flash,text/xml,application/xml,application/xhtml+xml,text/html;q=0.9,text/plain;q=0.8,video/x-mng,image/png,image/jpeg,image/gif;q=0.2,*/*;q=0.1
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
Authorization: Digest username="takao", realm="digest", nonce="CihtLb7VAwA=ed6e0900bd0a44f32acb6f2acc128903117aa3d5", uri="/takao/test/", algorithm=MD5, response="8337cc86cdf07d777f93ff35eab1867a", qop=auth, nc=00000001, cnonce="082c875dcb2ca740"

FIG.23

HTTP/1.1 200 OK
Date: Tue, 16 Mar 2004 11:48:34 GMT
Server: Apache/2.0.48 (Unix)
Authentication-Info: rspauth="3fcceb9646bf8d7425f4cf88056a33f4", cnonce="082c875dcb2ca740", nc=00000001, qop=auth
Last-Modified: Tue, 16 Mar 2004 10:32:36 GMT
ETag: "ec0fa-12-1dd27900"
Accept-Ranges: bytes
Content-Length: 18
Keep-Alive: timeout=15, max=99
Connection: Keep-Alive
Content-Type: text/html

CONTENT TRANSFER SYSTEM, CONTENT TRANSFER METHOD, CONTENT TRANSMITTING APPARATUS, CONTENT TRANSMISSION METHOD, CONTENT RECEIVING APPARATUS, CONTENT RECEPTION METHOD, AND COMPUTER PROGRAM

CROSS REFERENCES TO RELATED APPLICATIONS

The present document contains subject matter related to Japanese Patent Application JP 2004-113459 filed in the Japanese Patent Office on Apr. 7, 2004, the entire contents of which being incorporated herein by reference.

BACKGROUND OF THE INVENTION

1. Field of the Invention

The present invention relates to a content transfer system, a content transfer method, a content transmitting apparatus, a content transmission method, a content receiving apparatus, a content reception method, and a computer program for which a transmitting apparatus transfers content to a plurality of receiving apparatuses, in particular, those for which a server that stores content such as audio and visual data effectively transfers the content to clients in accordance with their requests.

In more detail, the present invention relates to a content transfer system, a content transfer method, a content transmitting apparatus, a content transmission method, a content receiving apparatus, a content reception method, and a computer program for which content is effectively transferred from a server to a plurality of clients so that the content is restricted for private use. In particular, the present invention relates to a content transfer system, a content transfer method, a content transmitting apparatus, a content transmission method, a content receiving apparatus, a content reception method, and a computer program for which content is effectively transferred from a server to a plurality of clients in accordance with the provision of Digital Transmission Content Protection (DTCP).

2. Description of Related Art

It is known that when a plurality of computers are mutually connected to a network, information and hardware resources are shared and collaborated by a plurality of users. There are a variety of media that connect computers, such as Local Area Network (LAN), Wide Area Network (WAN), and Internet.

Recently, circulation and distribution services for content such as video and music data through networks have been widespread. These sorts of services do not need to move media such as CDs and DVDs. In addition, a content distribution request equivalent to purchase of a medium can be remotely issued through a network. Content can be obtained by a simple process at low cost and almost in real time without need to deliver a medium.

However, content that is handled through networks are digital data that can be illegally manipulated, for example, copied and falsified, relatively with ease. Presently, illegal acts such as copy and falsification of digital content are being frequently performed. They are becoming a major factor that disturbs profit of digital content vendors. Thus, a vicious cycle of which a price of content is increased and digital content is prevented from being widespread has occurred.

Under the provision of the copyright law, digital content is protected against illegal uses such as copy without permission of the copyright owner and falsification of content. Article 30 of Japanese Copyright Law states that "It shall be permissible for a user to reproduce by himself a work forming the subject matter of copyright (hereinafter referred to as a "work") for the purpose of his personal use, family use or other similar uses within a limited circle (hereinafter referred to as "private use"), except . . . " In addition, Article 49 (1) states that if a user has produced a copy of the work for private use, when he uses the copy not for private, his act shall be considered to constitute the reproduction, namely this article prohibits the user from using the copied work not for private.

Nowadays, digital contents have been widely used and many techniques that protect copyright thereof have been developed. The DTCP, which is the industry standard, prescribes a scheme for which content is transmitted while its copyright is protected, for example, a communication range in which content is transferred and the number of devices that receive the content are restricted (for example, refer to Non Patent Document 1).

Originally, the DTCP prescribes transfer of digital content through a home network that uses IEEE 1394 or the like as a transfer path. Transfer of content through a home network is considered to be personal use or home use in the Copyright Law. The DTCP prescribes an authentication protocol for devices during a content transfer and a transfer protocol for encrypted content. In other words, a server that is a content provider authenticates a client that is a content recipient. The server encrypts a transfer path using a key shared by the server and the client through the authentication process and transfers the content to the client. Thus, in the DTCP, content can be transferred while it is protected. In addition, unless the client has been successfully authenticated with the server, since the client cannot obtain an encryption key, the client cannot enjoy the content.

In addition, recently, a technique of which the DTCP based on the IEEE 1394 is implemented to the IP network has been developed (hereinafter, this technique is referred to as the DTCP-IP). Many of home networks are connected to an external broadband network such as the Internet through a router or the like. Thus, with the establishment of the DTCP-IP technique, while digital content is protected, the content can be more flexibly and effectively used than the IP networks.

The DTCP-IP is a technique of which the DTCP is implemented to the IP network and adopted in the DTCP specification. However, in the DTCP-IP, the IP network is used as a transfer path and encrypted content is transferred in accordance with the HTTP or RTP protocol. Thus, in these points, the DTCP-IP is different from the DTCP based on the IEEE 1394 (as was described above). Various devices that are mainly PCs are connected through the IP network. Thus, data can be easily wiretapped and falsified, the DTCP-IP further prescribes another method for which content is transferred through a network while the content is protected (for example, refer to Non Patent Document 2).

Next, a transfer process for contents in accordance with the DTCP-IP will be described. DTCP compliant devices are categorized as two types. The first type is referred to as a DTCP_Source that is a server device that receives a request for content and transmits the content. The second type is a DTCP_Sink that is a client device that requests content, receives the content, and reproduces or records the content.

The DTCP_Source and the DTCP_Sink establish one TCP/IP connection and authenticate each other. This authentication is referred to as the DTCP authentication or the authentication and key exchange (AKE). In a DTCP compliant device, a unique device ID and a key have been embedded by a licensing organization called Digital Transmission Licensing Administrator (DTLA). In the DTCP authentication process, with these embedded information, after they have checked that they are right DTCP compliant devices, they can share a key to encrypt or decrypt content, which the DTCP_Source manages, with a DTCP_Sink device.

After the DTCP compliant devices have authenticated each other, the DTCP_Sink requests content from the DTCP_Source. The DTCP_Source can inform the DTCP_Sinc of a content location that represents the access destination of the content of the DTCP_Source through Content Directory Service (CDS) or the like in advance. When the DTCP_Sinc requests content from the DTCP_Source, the DTCP_Sinc can use a protocol such as the hyper text transfer protocol (HTTP) or the real time protocol (RTP). When the DTCP_Sinc requests content from the DTCP_Source in accordance with the HTTP, the DTCP_Source becomes an HTTP server and the DTCP_Sinc becomes an HTTP client. The HTTP server starts transferring the content to the HTTP client. When the DTCP_Sinc requests a content from the DTCP_Source in accordance with the RTP, the DTCP_Source becomes an RTP sender and the DTCP_Sinc becomes an RTP receiver. The RTP sender starts transferring the content to the RTP receiver. Besides these communication protocols, other protocols such as real time streaming protocol (RTSP) may be used.

When content is transferred in accordance with the HTTP, the HTTP client establishes a TCP/IP connection in accordance with the HTTP in addition to the TCP/IP connection for the DTCP authentication. The HTTP client requests content from the HTTP server in accordance with the same process as the regular HTTP. The HTTP server returns the requested content as an HTTP response to the HTTP client. Data transferred as the HTTP response are data of which content is encrypted with a key shared after the HTTP server, namely the DTCP_Source device, has AKE authenticated the HTTP client. The client device (DTCP_Sinc) that has received encrypted data decrypts data with the key shared after the client device has been authenticated and reproduces or records the decrypted data.

As described above, the DTCP-IP provides a safe content transfer method that prevents content from being wiretapped or falsified through a transfer path in the manner that DTCP compliant devices are authenticated by each other, a key is shared by the devices that have been DTCP authenticated by each other, and content to be transferred is encrypted and decrypted.

[Non Patent Document 1] DTCP Specification Volume 1 Version 1.3 (Informational Version).

[Non Patent Document 2] DTCP Volume 1 Supplement E Mapping DTCP to IP, Version 1.0 (Informational Version).

SUMMARY OF THE INVENTION

The DTCP prescribes an authentication protocol for which content is transferred between devices and a transfer protocol for the content. The DTCP-IP uses as the authentication protocol a combination of an authentication technique and a key sharing technique using the AKE. In addition, as the content transfer protocol, the HTTP, RTP, or the like can be used to transfer content through the IP network.

However, in a system that protects a content and transfers it in accordance with the DTCP-IP, if the location of the content that is accessed is designated in accordance with the HTTP, any device that has not been DTCP authenticated can directly access the location in accordance with the HTTP and obtain encrypted content. This is because the DTCP-IP separately defines an authentication process and a content transfer process and these processes are executed with independent TCP/IP connections.

First, the client sends a content request to the location of content that the client can access in accordance with the CDS or the HTTP that the user inputs. The server encrypts the requested content in accordance with the DTCP-IP and sends the encrypted content back to the client. The DTCP compliant client decrypts the encrypted content and reproduces or records the decrypted content in accordance with the DTCP-IP.

When the client is not a DTCP compliant device, although the client can receive encrypted content from the server, the client cannot decrypt the encrypted content and reproduce or record the decrypted content because the client does not share the encryption key with the server. In this case, although the content is encrypted and transferred, it can be said that the content itself is protected since the client cannot use the content.

However, when the server receives various requests from devices not compliant with DTCP and the server encrypts content in response to the requests and transfer the encrypted content to the devices, the computational resource and network bandwidth for the content are wasted. In the DTCP-IP, the authentication process and the content transfer process can be separately executed. A device that is not compliant with DTCP can request content from the server. Thus, the content request may become an attack against the server.

This situation will result in preventing the server from receiving requests from right devices that the server has DTCP authenticated and in deteriorating the quality of content transferred to the right devices. In addition, transfer of encrypted content to a device that is not compliant with DTCP will result in nothing but a kind of a waste of the bandwidth.

In view of the foregoing, it would be desirable to provide a content transfer system, a content transfer method, a content transmitting apparatus, a content transmission method, a content receiving apparatus, a content reception method, and a computer program which allows a server that stores content such as visual data, audio data, and so forth to effectively transfer content to a client corresponding to a request that the client issues.

It would be desirable to provide a content transfer system, a content transfer method, a content transmitting apparatus, a content transmission method, a content receiving apparatus, a content reception method, and a computer program which allows the server to effectively transfer content to a plurality of clients while causing them to use the content for private use.

It would be desirable to provide a content transfer system, a content transfer method, a content transmitting apparatus, a content transmission method, a content receiving apparatus, a content reception method, and a computer program allowing the server to effectively transfer content to a plurality of clients in accordance with the provisions of the DTCP.

It would be desirable to provide a content transfer system, a content transfer method, a content transmitting apparatus, a content transmission method, a content receiving apparatus, a content reception method, and a computer program which enables prevention of wasting in computational performance and network width caused when a server encrypts and transfers content in response to a content request from a client not compliant with DTCP so that a content transfer process can be effectively performed.

A first embodiment of the present invention is a content transfer system for transferring content from a content transmitting apparatus to a content receiving apparatus through a network while taking content protection into account. The system comprises authentication process executing means for executing an authentication process between the content transmitting apparatus and the content receiving apparatus and sharing authentication information therebetween; and content transfer process executing means for encrypting content to be transferred in response to a content request from the content receiving apparatus and transferring the encrypted content from the content transmitting apparatus to the content receiving apparatus. In the system, the content transfer process executing means starts a transfer process for the encrypted content in response to a confirmation of a keyword indicating that the content receiving apparatus has been authenticated being contained in the content request.

It is noted that the "system" used herein is a group of a plurality of apparatuses or functional modules that accomplish predetermined functions regardless of whether each apparatus or each functional module is disposed in a single housing.

The content transmitting apparatus and the content receiving apparatus are apparatuses compliant with DTCP. Unique device IDs and keys are embedded in the content transmitting apparatus and the content receiving apparatus in accordance with the Digital Transmission Licensing Administrator (DTLA).

The authentication process executing means executes authentication of the content transmitting apparatus and the content receiving apparatus in accordance with DTCP authentication or Authentication and Key Exchange (AKE) after establishing a connection between the content transmitting apparatus and the content receiving apparatus.

The content transfer process executing means transfers content in accordance with one of Hyper Text Transfer Protocol (HTTP), Real Time Protocol (RTP), and Real Time Streaming Protocol (RTSP).

In DTCP-IP, the authentication process executing means and the content transfer process executing means can establish respective connections between the content transmitting apparatus and the content receiving apparatus and independently execute their processes. The authentication process executing means and the content transfer process executing means establish connections between the content transmitting apparatus and the content receiving apparatus in accordance with, for example, TCP/IP.

In a case where the authentication process and the content transfer process are executed with independent TCP/IP connections, a client that has not been authenticated may request content and the content may be transferred to the client. The content itself can be protected since the content is encrypted before being transferred. However, when the content transmitting apparatus receives requests from many content receiving apparatuses that have not been authenticated and the content transmitting apparatus encrypts the content and transfer the encrypted content to the content receiving apparatuses, the computational performance of the content transmitting apparatus and network bandwidth are uselessly wasted away. As a result, the transfer quality of content to right content receiving apparatuses that have been DTCP authenticated may deteriorate. For example, if illegal content receiving apparatuses that have not been authenticated issue many content requests, the computational load increases and the network bandwidth are wasted away like an attack against the content transmitting apparatus.

In contrast, according to the embodiment of the present invention, the content receiving apparatus inserts a keyword representing that the content receiving apparatus has been authenticated into the content request. The content transmitting apparatus transfers the encrypted content to the content receiving apparatus after checking that the content request received from the content receiving apparatus contains such keyword.

In other words, according to the embodiment of the present invention, transmitting of encrypted content which may cause waste of the computational performance and the network bandwidth can be prevented in advance since the server may reject the content request transferred from a device that has not been correctly authenticated.

A plurality of types of keywords that differ in check levels that represent accuracy (or robustness or load of authentication process) of authentication checks may be defined. A supported check level may be changed corresponding to the process performance of the server side or the like.

For example, the keyword may be composed of an identifier representing a check level and a keyword value corresponding to the check level.

As a keyword value with the lowest check level, that is, as a keyword level having less robustness but requiring less load for an authentication process, a flag indicating whether or not the authentication is completed, or an arbitrary character string known to the content transmitting apparatus or the content receiving apparatus can be used. When a keyword of this type is used, the computation load of the authentication process may be lightened.

As a keyword in the second lowest check level, one generated with at least part of information composing the authentication information obtained by the authentication process executing means may be used.

In an authentication process based on DTCP-IP, authentication information includes public information that is transferred through the network and shared and confidential information that is not transferred through the network but shared. The keyword value to be contained in the content request may be generated with the public information contained in the authentication information.

Alternatively, the keyword may be generated with the confidential information contained in the authentication information. However, to secure the confidentiality of the original data, it is preferred that the confidential information is converted into a message digest to be used to generate the keyword. In this case, although the process load to check whether the content receiving apparatus has been authenticated increases, the accuracy, namely robustness, of the authentication check improves.

Alternatively, the keyword may be composed of data of a combination of the public information and the confidential information contained in the authentication information or data obtained by processing the public information and the confidential information.

In addition, the content transfer system according to the embodiment of the present invention may be achieved based on HTTP. In other words, the content receiving apparatus is a client apparatus requesting content in accordance with HTTP, whereas the content transmitting apparatus is a server apparatus transmitting the content in accordance with HTTP.

In such a case, the content receiving apparatus insert a keyword in an HTTP request and the content transmitting apparatus extracts the keyword from the HTTP request to judge whether or not the content receiving apparatus has been authenticated on the basis of the validity of the keyword.

The keyword indicating that the content receiving apparatus has been authenticated may be generated with the authentication information shared by the content transmitting device and the content receiving device, digest authentication information in accordance with HTTP, and information having another attribute. Whether or not the content receiving apparatus has been authenticated may be checked based on whether or not the keyword generated by the content transmitting apparatus using information with the attribute and the keyword generated by the content receiving apparatus using information with the same attribute as the content transmitting apparatus are the same.

The content receiving apparatus may insert the keyword in a query character string of a request URI or a header portion of the HTTP request.

The keyword indicating that the content receiving apparatus has been authenticated may be data generated with the authentication information obtained by the authentication process executing means and inserted into an authenticate header field in the HTTP digest authentication. In this case, it is assumed that the identifier of the keyword is "Authentication" and that the value of the keyword is the value of the "Authentication Header Field". In the HTTP digest authentication, it may be determined whether a client has been authenticated in accordance with a user name contained in the authentication header and a response value. The user name is a public value such as the device ID of the client device used in the DTCP authentication. The response value is a value generated with confidential information shared with the server device as a password after the client has been authenticated. The response value generated in this manner may be also generated by the server. When the response value received from the client is compared with the response value generated by the server device, the validity of the response value may be ascertained.

In a case where the value of the keyword is a binary value, the content receiving apparatus may convert the value into character string data and insert the converted data into a header of an HTTP request.

The content receiving apparatus may insert a plurality of keywords into an HTTP request at a time. For example, although a plurality of types of keywords that differ in check levels that represent accuracy of authentication checks have been defined, if a check level that the content transmitting apparatus side as the server supports is unknown, a plurality of keywords corresponding to individual check levels may be generated and inserted into the HTTP request for a content request.

In a case where the HTTP request that the content transmitting apparatus has received does not contain the keyword in a check level that the content transmitting apparatus itself supports, it may send back an HTTP error response in which the check level that the content transmitting apparatus supports is embedded.

In a case where the content receiving apparatus has not issued a content request that contains a keyword in a check level that the HTTP error response describes, the content receiving apparatus may retry to issue the content request.

In a case where the HTTP request contains a plurality of keywords, the content transmitting apparatus checks the validity thereof by using a keyword in the highest check level of those that the apparatus supports.

The content transmitting apparatus may check whether an IP address of the content receiving apparatus that has requested content in the HTTP request is contained in the authentication information obtained by the authentication process executing means.

A second embodiment of the present invention is a computer readable program for causing a computer system to execute a content transmission process for transferring content to a content receiving apparatus through a network while protecting the content. The program comprises an authentication process executing step of executing an authentication process with the content receiving device and sharing authentication information; and a content transfer process executing step of encrypting content to be transferred in response to a content request received from the content receiving apparatus and transferring the encrypted content to the content receiving apparatus. In the content transfer process executing step, in response to confirmation of validity of a keyword contained in the content request and indicating that the content receiving device has been authenticated, a transfer process of the encrypted content is started.

A third embodiment of the present invention is a computer readable program for causing a computer system to execute a process for receiving a content from a content transmitting device through a network while protecting the content. The program comprises an authentication process executing step of executing an authentication process with the content transmitting apparatus and sharing authentication information with the content transmitting apparatus; and a content transfer process executing step of issuing a content request that contains a keyword that represents that the content receiving apparatus has been authenticated and receiving an encrypted content transferred in response to the content request.

In the computer programs of the second and third embodiments of the present invention, a computer program is defined in a computer readable format so that a predetermined process may be accomplished in a computer system. In other words, when the computer programs of the second and third embodiments of the present invention are installed to the computer systems, the computer systems cooperatively operate as a content transmitting apparatus and a content receiving apparatus. When the apparatuses cooperatively operate and transfer content therebetween, the same effect as the content transfer system of the first embodiment of the present invention may be accomplished.

According to an embodiment of the present invention, a content transfer system, a content transfer method, a content transmitting apparatus a content transmission method, a content receiving apparatus, a content reception method, and a computer program can be provided which allows a server to effectively transfer content to a plurality of clients while causing them to use the content for private use.

In addition, according to an embodiment of the present invention, a content transfer system, a content transfer method, a content transmitting apparatus, a content transmission method, a content receiving apparatus, a content reception method, and a computer program can be provided which allows a server to effectively transfer content to a plurality of clients in accordance with the provisions of the DTCP.

In addition, according to an embodiment of the present invention, a content transfer system, a content transfer method, a content transmitting apparatus, a content transmission method, a content receiving apparatus, a content reception method, and a computer program can be provided which enables prevention of wasting the computational performance and network bandwidth caused when a server device receives a content request from a client and encrypts the content and transfers the encrypted contents to the clientto provide an effective content transfer process According to an embodiment of the present invention, information called a keyword indicating whether a client has been DTCP authenticated is used.

Keywords have many types. One type of keyword is a flag indicating whether a client has been authenticated. Another type of keyword is generated with a public parameter exchanged when a client is authenticated. Another type of keyword is generated with a confidential parameter shared when a client is authenticated. When a keyword is generated with a confidential parameter, by converting the confidential parameter into a message digest, the confidentiality of an original parameter is maintained.

Depending on which type of keyword is used, the robustness against an illegal operation such as falsification and the performance of the authentication process vary. According to an embodiment of the present invention, depending on the robustness and process load, keywords having a plurality of levels are defined. To generate a complicated keyword having a high check level, a server needs to have high performance.

According to an embodiment of the present invention, a check level that the server supports can be changed corresponding to the process performance of the server side. In other words, since there are several types of keywords that servers ranging from a low performance server to a high performance server support, only by changing a check level of a keyword, the server for use can be expected to have an optimum effect corresponding to the specification and load state of the server.

In addition, the content transfer system according to an embodiment of present invention is based on the DTCP-IP and HTTP. Thus, since the content transfer system does not need to extend and change the standards, the development cost of the system can be estimated to be low. In addition, the system can operate a device that does not accord to the embodiment corresponding to the standards.

BRIEF DESCRIPTION OF THE DRAWINGS

The invention will become more fully understood from the following detailed description, taken in conjunction with the accompanying drawing, in which:

FIG. 3 is a schematic diagram showing an example of which a keyword in level 1 is inserted into a query character string of an HTTP request;

FIG. 4 is a schematic diagram showing an example of which the keyword in level 1 is inserted into an option header of an HTTP request;

FIG. 5 is a schematic diagram showing an example of which a keyword in level 2 is inserted into a query character string of an HTTP request;

FIG. 6 is a schematic diagram showing an example of which a keyword in level 2 is inserted into an option header of an HTTP request;

FIG. 7 is a schematic diagram showing an example of a structure of a keyword in level 2;

FIG. 8 is a schematic diagram showing an example of which a keyword in level 3 is inserted into a query character string of an HTTP request;

FIG. 9 is a schematic diagram showing an example of which a keyword in level 3 is inserted into an option header of an HTTP request;

FIG. 10 is a schematic diagram showing an example of which a keyword in level 4 is inserted into a query character string of an HTTP request;

FIG. 11 is a schematic diagram showing an example of which a keyword in level 4 is inserted into an option header of an HTTP request;

FIG. 12 is a schematic diagram showing an example of which a keyword in level 5 is transferred to a server using HTTP digest authentication;

FIG. 13 is a schematic diagram showing an example of which content is requested with two keywords in level 3 and level 4 designated;

FIG. 14 is a schematic diagram showing an example of a structure of an HTTP response that a server that supports any one of keywords in check levels 1 to 4 returns;

FIG. 15 is a schematic diagram showing an example of a structure of an HTTP response that a server that supports any one of keywords in check levels 1 to 4 returns;

FIG. 16 is a schematic diagram showing an example of a structure of an HTTP response of which a server that supports check level 5 informs a client;

FIG. 17 is a schematic diagram showing an example of a structure of an HTTP response of which a server that supports check level 5 informs a client;

FIG. 20 shows a specific example of which a content request and a response against the request are performed between a DTCP-IP client device and a DTCP-IP server in accordance with the HTTP protocol;

FIG. 21 shows a specific example of which a content request and a response against the request are performed between a DTCP-IP client and a DTCP-IP server in accordance with the HTTP protocol;

FIG. 22 shows a specific example of which a content request and a response against the request are performed between a DTCP-IP client and a DTCP-IP server in accordance with the HTTP protocol; and FIG. 23 shows a specific example of which a content request and a response against the request are performed between a DTCP-IP client and a DTCP-IP server in accordance with the HTTP protocol.

DESCRIPTION OF THE PREFERRED EMBODIMENT

Figure 1:
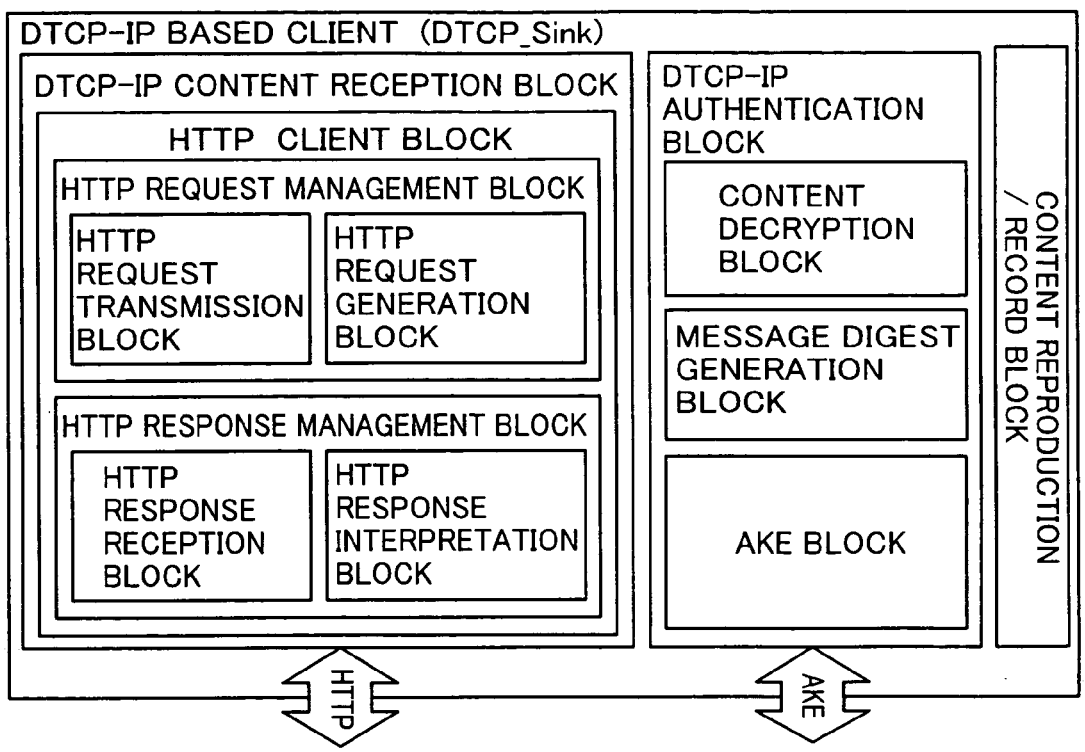
FIG. 1 is a schematic diagram showing a functional structure of a client device that operates in a content transfer system according to an embodiment of the present invention.

Next, with reference to the accompanying drawings, a content transfer system according to an embodiment of the present invention will be described exemplifying a case where a DTCP compliant server device transfers encrypted content to a DTCP compliant client device.

When the DTCP compliant server device accepts a content request from any client device in accordance with the HTTP, the server device analyzes the request in accordance with the HTTP. According to this embodiment, the client device inserts a parameter that has been generated during the DTCP authentication into the content request. The server device determines whether the accepted client device has been DTCP authenticated. The server device sends an encrypted content back to the client device that has been DTCP authenticated in accordance with the DTCP-IP. The server device sends an HTTP error response to the client device that has not been DTCP authenticated.

According to this embodiment, since the server device can reject a content request for a device that has not been authenticated, the process load and network bandwidth can be prevented from unnecessarily increasing.

In specific, the embodiment of the present invention provides a mechanism of which when a client requests content from the server in accordance with the HTTP, the client inserts a keyword into the content request and the server checks the keyword contained in the request. With the mechanism, when the server processes a content request, the server can determine whether a client that requested the content is the device that has been DTCP authenticated.

The keyword used fro determining whether the client has been authenticated or not is classified into, for example, five levels that differ in accuracy of authentication checks. When the accuracy of the authentication check is high, the robustness of the keyword is high. However, accordingly, the process load for the authentication check increases. In contrast, when the accuracy of the authentication check is low, the process load for the authentication check decreases. However, accordingly, the robustness of the keyword becomes low. The server device can designate the level of the keyword that the server device supports corresponding to its performance.

A client that has been correctly DTCP authenticated incorporates a keyword in a level that the server supports into a content request and sends the resultant content request to the server. In a case where the client has been DTCP authenticated and the keyword contained in the content request does not match the keyword that server has, or in a case where the client has been correctly DTCP authenticated but the content request contains any experimental one of keywords because the level that the server supports is unknown or the content request contains no keyword so that the keyword does not match the level of the keyword that the server has, the server sends an HTTP error response back to the client. At this point, the HTTP error response describes the level of a keyword that the server supports. Thus, when the client inserts the keyword in the level that the server supports into a content request, the client can retry to request the content from the server.

Thus, according to the embodiment of the present invention, since the server needs to encrypt content and transfer the encrypted content to a device that has been DTCP authenticated, the process load and the total communication bandwidth necessary to encrypt the content and transfer the encrypted content can be decreased. In addition, since there are check levels that differ in accuracy of DTCP authentication, a proper check level can be designated in accordance with the performance of the server.

Figure 2:
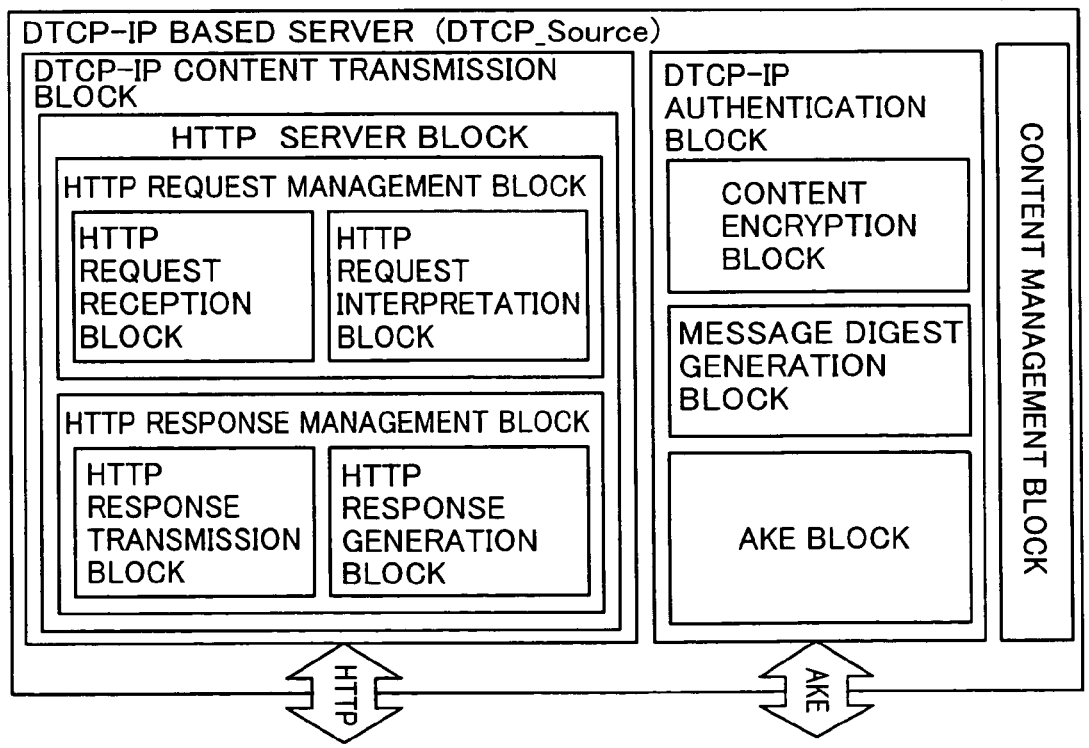
FIG. 2 is a schematic diagram showing a functional structure of a server device that operates in the content transferring system according to the embodiment of the present invention.

FIG. 1 and FIG. 2 schematically show functional structures of a client device and a server device that operate in the content transfer system according to the embodiment of the present invention. The client device and the server device can establish connections over a TCP/IP network such as the Internet (not shown). With the connections, the server device and the client device can perform the authentication process and the content transfer process.

The client device and the server device can be designed and produced as dedicated hardware devices. Alternatively, a predetermined client application and a predetermined server application may be installed to and executed on general computer systems such as personal computers.

The client device shown in FIG. 1 is compliant with the DTCP-IP specification The client device operates as a DTCP_Sink. The client device shown in FIG. 1 has as functional blocks a DTCP-IP authenticating block, a DTCP-IP content receiving block, and a content reproducing/recording block.

The DTCP-IP authenticating block corresponds to an authentication process executing means. The DTCP-IP authenticating block has an AKE block, a message digest generating block, and a content decrypting block.

The AKE block is a block that executes an AKE mechanism (DTCP_Sink side) of the DTCP-IP. The AKE block also has a function that passes a parameter to the message digest generating block (that will be described later) that requests the parameter.

The message digest generating block is a block that generates a message digest of a parameter in accordance with a designated algorithm. One of message digest generating algorithms provided in advance may be used. As the provided algorithms, there are algorithms with respect to a unidirectional hash function such as MD5 and SHA-1 (like MD5, SHA-1 is a modification of MD4. However, since SHA-1 generates a 160-bit hash value, the robustness of SHA-1 is superior to that of the MD series).

The message digest generating block operates closely in cooperation with the AKE block that stores a parameter that should be kept confidential against the outside of the DTCP-IP authenticating block so that a message digest of the parameter can be generated. The message digest generating block can request a parameter from the AKE block and generate a message digest of the parameter or a message digest of a parameter supplied from the outside of the AKE block.

The content decrypting block is a block that decrypts encrypted content data received from the server with a key exchanged by the AKE block. The decrypted content is sent to the content reproducing/recording block.

The content reproducing/recording block reproduces the decrypted content in the reproduction mode. The content reproducing/recording block stores the decrypted content in the record mode.

The DTCP-IP content receiving block corresponds to a content transfer process executing means. The DTCP-IP content receiving block has an HTTP client block. The DTCP-IP content reception block as an HTTP client requests content from the HTTP server and receives the requested content from the HTTP server.

The HTTP client block is composed of an HTTP request managing block and an HTTP response managing block. The HTTP request managing block is composed of an HTTP request transmitting block and an HTTP request generating block.

The HTTP request generating block generates a content transfer request (HTTP request) to be transmitted. The HTTP request transmitting block transmits the generated HTTP request to the server.

The HTTP response managing block is composed of an HTTP response receiving block and an HTTP response interpreting block. The HTTP receiving block receives an HTTP response and encrypted content from the server. The HTTP response interpreting block checks the received HTTP response. When the checked result is OK, the HTTP response interpreting block sends the received encrypted content to the content decrypting block. When the checked result is NG, the HTTP response interpreting block performs a process for an error response.

The DTCP-IP authenticating block and the DTCP-IP content receiving block establish respective TCP/IP connections with the server device and independently execute the authentication process and the content transfer process.

The server device shown in FIG. 2 is compliant with the DTCP-IP specification and operates as a DTCP_Source. The server device has as functional blocks a DTCP-IP authenticating block, a DTCP-IP content transmitting block, and a content managing block.

The DTCP-IP authenticating block corresponds to an authentication process executing means. The DTCP-IP authenticating block has an AKE block, a message digest generating block, and a content encrypting block.

The AKE block is a block that accomplishes an AKE mechanism (DTCP_Source side) in accordance with the DTCP-IP. This block has a function that passes a parameter to a message digest generating block that requests it (that will be described later). The AKE block has information with respect to each of DTCP_Sink devices that have been authenticated. The information is used to determine whether a client that has requested content had been correctly authenticated.

Table 1 lists a part of information stored in the AKE block with respect to authenticated devices, namely authentication information. The authentication information is shared by the server device and client devices (DTCP_Sinks) that have been authenticated through the AKE block. Public/Confidential fields listed in the table represent whether each parameter can be obtained. In other words, the authentication information is largely categorized as public information and confidential information. Public information is propagated through the TCP/IP network and shared by the server device and the client devices. Confidential information is not propagated through the TCP/IP network. Confidential information is generated by performing a predetermined arithmetic operation for public information and unique information of the devices and shared by the server device and the client devices. For example, an authentication key $K_{auth}$ and a content key $K_x$ that encrypts content to be transferred are confidential information.

TABLE 1

| INFORMATION (PARAMETER NAME) | DESCRIPTION | PUBLIC/ CONFIDENTIAL |
|---|---|---|
| DTCP_SINK IP ADDRESS | IP ADDRESS OF DTCP_SINK THAT HAS BEEN AUTHENTICATED | PUBLIC |
| AKE_LABEL | IDENTIFIER OF AUTHENTICATION SESSION | PUBLIC |
| DTCP_SINK DEVICE ID | DEVICE ID OF DTCP_SINK OF AUTHENTICATION | PUBLIC |
| $K_{AUTH}$ | $K_{AUTH}$ OF AUTHENTICATION | CONFIDENTIAL |
| $K_X$ | $K_X$ OF AUTHENTICATION | CONFIDENTIAL |

The message digest generating block is a block that generates a message digest of a parameter in accordance with a predetermined algorithm. An algorithm provided in advance may be designated as the algorithm for generating a message digest. As described above, algorithms provided in advance includes algorithms with respect to a unidirectional hash function, such as MD5 and SHA-1.

The message digest generating block operates closely in cooperation with the AKE block that stores a parameter that should be kept confidential against the outside of the DTCP-IP authenticating block so that a message digest of the parameter can be generated. The message digest generating block can request a parameter from the AKE block and generate a message digest of the parameter or a message digest of a parameter supplied from the outside of the AKE block.

The content encrypting block is a block that encrypts content data that are read from the content managing block in accordance with a request from the DTCP-IP content transmitting block with a key exchanged by the AKE block. The encrypted content is passed to the DTCP-IP content transmitting block so that it transmits the decrypted content to the client.

The content managing block is a block that manages content to be protected by the mechanism of the DTCP-IP. In response to reading out by the content encrypting block, the content managing block passes data of the content to the content encrypting block.

The DTCP-IP content transmitting block corresponds to a content transmission process executing means. The DTCP-IP content transmitting block has an HTTP server block. The HTTP server block as an HTTP server accepts a request from a client and executes a process corresponding to the request.

The HTTP server block is composed of an HTTP request managing block and an HTTP response managing block. In addition, the HTTP request managing block is composed of an HTTP request receiving block and an HTTP request interpreting block.

The HTTP request receiving block receives an HTTP request from a client. The received HTTP request is sent to the HTTP request interpreting block. The HTTP request interpreting block checks the HTTP request. In a case where the checked result of the HTTP request interpreting block is OK, information of the HTTP request is sent to the DTCP-IP authenticating block.

The HTTP response managing block is composed of an HTTP response generating block and an HTTP response transmitting block.

In a case where the checked result of the HTTP request interpreting block is OK, the HTTP response generating block generates an HTTP response of encrypted content that is sends back to the client. In contrast, in a case where the checked result of the HTTP request interpreting block is NG, the HTTP response generating block generates an HTTP response of an error to be sent back to the client.

The HTTP response transmitting block transmits the generated HTTP response to the client that has requested. In a case where the checked result of the HTTP request interpreting block is OK, the HTTP response transmitting block transmits an HTTP response header followed by the encrypted content to the client.

The DTCP-IP authenticating block and the DTCP-IP content transmitting block establish respective TCP/IP connections with the client device and independently execute the authentication process and the content transfer process, respectively.

In the content transfer system according to the embodiment of the present invention, when a client that has been DTCP authenticated requests content in accordance with the HTTP, the client inserts a special keyword into an HTTP request that the client issues.

A keyword is composed of a flag, a special character string, or the like that represents whether the client itself has been DTCP authenticated. A keyword is composed of, for example, data that are a combination of public information and confidential information contained in authentication information (Table 1) shared by the server and the client in accordance with DTCP authentication procedures or data obtained by processing the public information and the confidential information. In this example, the "process" means a conversion from original information into a message digest using an algorithm such as MD5 or SHA-1. When confidential information is converted into a message digest, it can be treated as public information and used to generate a keyword.

According to this embodiment, in keywords, check levels that differ in accuracy of authentication checks are defined. When the check level is higher, the robustness of the keyword becomes higher and the authentication check becomes more accurate. However, accordingly, the process load of the authentication check increases. In contrast, when the check level is lower, the process load of the authentication check more decreases. However, accordingly, the robustness of the keyword and the accuracy of the authentication check weaken.

A client may insert a plurality of keywords into an HTTP request that requests content. A keyword is composed of an identifier indicating the type of the keyword and a value corresponding to the identifier. A keyword is inserted into an URI query character string of an HTTP request or a header of an HTTP request as will be described later.

In a case where the server side accepts the keyword contained in the HTTP request, the server side compares and matches the keyword with a keyword that the server side has and checks the validity of the keyword contained in the HTTP request. In a case where a plurality of keywords of which original data have been processed (converted into a message digest) are contained in the request, if there is a keyword that the server supports, the server side generates a keyword with data having the same attribute and compares and matches the keyword contained in the request with the generated keyword so as to check the validity of the keyword. In a case where the request contains a plurality of keywords in different check levels, the server selects a keyword in the highest check level that the server supports and compares and collates the selected keyword with the generated keyword. As a result, the server can accurately perform the authentication check.

If the server confirms the validity of the keyword through the comparison and matching, the server starts transferring content to the client. In contrast, in a case where the keyword contained in the request is a keyword that the server does not support, where the keyword contained in the request does not match the keyword that the server has, or where the request does not contain a keyword, the server does not transfer the content, but sends an HTTP error response back to the client. The HTTP error response describes the type of a keyword that the server supports and informs the client of the type of the keyword that the server supports. Thus, the client can generate a proper keyword and request content from the server.

Keywords that the client generates and inserts into the HTTP request are defined with five check levels to easily generate the keywords and protect original data.

A keyword in the lowest check level is defined as level 1. This keyword directly represents that the client has been DTCP authenticated. A client that has been DTCP authenticated inserts this keyword into a content request. This keyword is any character string including a null character as a value. FIG. 3 and FIG. 4 show an example in which the level-1 keyword is inserted into a query character string of an HTTP request and an example in which the level-1 keyword is inserted into an option header of an HTTP request, respectively. In the examples, the level-1 keyword is indicated with a character string "X-DTCP-AUTH-ENDED". The keyword has a value of a character string "true". If this keyword is contained in the HTTP request, it is indicated that the client has been DTCP authenticated. If this keyword is not in the server, in is indicated that the client has not been authenticated.

A keyword in the second lowest check level is defined as level 2. A level-2 keyword is indicated with a character string "X-DTCP-AUTH-INFO". Information used in the DTCP authentication is used as a value of the level-2 keyword. FIG. 5 and FIG. 6 show an example of the level-2 keyword inserted into a query character string of an HTTP request and an example of the level-2 keyword inserted into an option header of an HTTP request, respectively. In FIG. 5 and FIG. 6, a character string "XXX" represents a value generated on the basis of public information shared during the DTCP authentication. The value may be the public information itself during the authentication. Alternatively, the value may be data generated by connecting, combining, or processing the public information. The value can be compared and matched between the server device and the client device. As shown in FIG. 7, the level-2 keyword may be generated by connecting AKE_label contained in authentication information and a message digest of a device ID of a DTCP_Sink. However, the present invention does not limit the generating method for the value. Instead, according to the embodiment of the present invention, data are generated with a public value shared during the DTCP authentication and the value is inserted into a content request.

A parameter used to generate the value of a level-2 keyword is a public parameter shared during the DTCP authentication and recognized by both the client and the server.

The definition of the "message digest" in this embodiment is almost the same as a "hash value." The "message digest" means data generated using a unidirectional function that does not allow data to be restored to original data. In other words, with a message digest, the original data cannot be estimated. However, the original data and the generated data have a relation of one to one (this definition will be applied in the following description).

A keyword in the next higher check level is defined as level 3. A level-3 keyword is indicated with a character string "X-DTCP-DIGEST-MD5". A confidential parameter exchanged during the DTCP authentication is used as a value of the level-3 keyword. The confidential information or confidential parameter is a parameter that is not communicated as it is in an authentication connections and that is shared by a DTCP_Sink device and a DTCP_Source device after the authentication. Confidential parameters are, for example, $K_{auth}$ and $K_x$. FIG. 8 and FIG. 9 show an example of the level-3 keyword inserted into a query character string of an HTTP request and an example of the level-3 keyword inserted into an option header of the HTTP request, respectively. In FIG. 8 and FIG. 9, a character string "YYY" represents a confidential parameter or message digest data generated by converting a combination of confidential parameters or a processed confidential parameter in accordance with a hash algorithm called MD5. Although confidential parameters should be kept confidential, they are open to public (that is, transferred through a network) as a message digest. The message digest is sent to the server. The server generates the similar message digest and checks whether the message digest of the client matches that of the generated one. As a result, the server can check the validity of the keyword. The present invention does not limit the selection and process for confidential parameters for generating a practical value. Instead, according to the embodiment of the present invention, a confidential parameter exchanged during the DTCP authentication is converted into a message digest in accordance with the MD5 algorithm and the resultant value is inserted into a content request.

A keyword in the next higher check level is defined as level 4. A level-4 keyword is indicated with a character string "X-DTCP-DIGEST-SHA-1". A confidential parameter exchanged during the DTCP authentication is used as a value of the level-4 keyword. FIG. 10 and FIG. 11 show an example of the level-4 keyword inserted into a query character string of an HTTP request and an example of the level-4 keyword inserted into an option header of the HTTP request, respectively. In FIG. 10, a character string "ZZZ" represents a confidential parameter or message digest data generated by converting a combination of confidential parameters or a processed confidential parameter in accordance with a hash algorithm called SHA-1. However, the present invention does not limit the selection and process for a confidential parameter for generating a practical value. According to the embodiment of the present invention, a confidential parameter exchanged during the DTCP authentication is converted into a message digest in accordance with the SHA-1 algorithm and the resultant value is inserted into a content request.

A keyword in the next higher check level is defined as level 5. A level-5 keyword is accomplished by using the HTTP digest authentication and transmitted as an authentication header used in the HTTP digest authentication. In this case, the level-5 keyword is indicated with an identifier "Authentication" and a value of an Authentication Header field is used as a value of the keyword. In the HTTP digest authentication, a challenge value is sent from a server to a client in response to a request from the client. The client issues an HTTP request accompanying a response generated on the basis of the received challenge value, a user name of the client, a password of the user and the like. Similarly, the server device generates a response and compares the two responses so as to determine whether the client is to be authenticated. In the method using the level-5 keyword, in the HTTP digest authentication, the server determines whether the client has been authenticated depending on the user name and response value contained in the Authentication Header. The user name is a value such as the ID of the client open to public during the DTCP authentication. The response value is generated with a confidential parameter ($K_{auth}$ or $K_x$) as a password shared with the server after the authentication. Likewise, the server can generate a response value in the same manner and compare the value of the client with the generated value of the server.

FIG. 12 shows an example in which a level-5 keyword is transferred to the server device using the HTTP digest authentication. In the example shown in FIG. 12, as a user name, a device ID "DEVICE_ID" of a client having been exchanged during the authentication is used. As a response value, "CONFIDENTIAL_PARAM_INCLUDED_AS_PASSWORD" is used. CONFIDENTIAL_PARAM_INCLUDED_AS_PASSWORD is a message digest "response_digest" into which a confidential parameter shared after the authentication is converted with a password corresponding to the user name DEVICE_ID. Values used in the regular HTTP digest authentication are inserted into fields shown as "...". The level-5 keyword is compared using the HTTP digest authentication. Thus, to explicitly distinguish the HTTP digest authentication from the regular HTTP digest authentication, an option header "X-DTCP-AUTH-HTTP" is added. Alternatively, a query character string "X-DTCP-AUTH-HTTP" may be added to a request URI.

The present invention does not limit the selection and process for a parameter used in the authentication for generating a practical response-digest value. According to the embodiment of the present invention, the HTTP digest authentication is performed assuming that a formal parameter exchanged during the DTCP authentication is a user name and a confidential parameter is a password corresponding to user name.

It is assumed that parameters used as original values of keywords in check levels 3, 4, and 5 are confidential information shared during the DTCP authentication. To strengthen the authentication check, public information may be combined with the confidential information.

As shown in FIG. 4, FIG. 6, FIG. 9, and FIG. 11, in the embodiment of which a keyword is inserted into an HTTP header, if the value of the keyword is binary data, it is transferred after it is converted into a character string such as a hexadecimal ASCII character that can be restored to the original data.

Next, the performance and security of each check level will be described.

A level-1 keyword only represents that a client has been DTCP authenticated when the client requests content from a server. The server supporting the check level 1 checks whether the request received from the client contains the keyword. This process is very simple so that any client can clear this authentication check if only it inserts the similar option into an HTTP request header. Thus, the safety of this check level is low. However, this check level is very effective for rejecting accesses from a client incapable of freely adding an HTTP request header, for example, a web browser and a search engine robot. This check level is further suitable for a server that cannot hold authentication information.

With a level-2 keyword inserting authentication information open to public into a request, a client can be checked in more detail than with the level-1 keyword. In a case where information that identifies an authentication session (for example, AKE_label) is added to the keyword, by checking the combination of the IP address of the client device and the authentication session, the server can determine whether the client has been actually authenticated.

A level-3 keyword is composed of a message digest of confidential information that cannot be shared unless the client has been DTCP authenticated. In the check level 3, a message digest is generated in accordance with the MD5 algorithm. When the server side receives a correct value from the client side, the server side can determine that the client side has been correctly authenticated. In a case where confidential information that a client uses depends on the authentication session, namely, confidential information varies in each authentication session, the client may combine the confidential information and public information corresponding to the authentication session. In a case where a keyword contains information that identifies the authentication session (for example, AKE_label), by checking the combination of the IP address of the client and the authentication session, the server can determine whether the client has been authenticated.

Although a level-4 keyword has an attribute that is the same as that of the level-3 keyword, as an algorithm that generates a message digest, SHA-1 is used. As well known, the amount of information of the SHA-1 algorithm is larger than that of the MD5 algorithm. Thus, the SHA-1 algorithm is stronger than the MD5 algorithm. As a result, the check level 4 is stronger than the check level 3.

A level-5 keyword is accomplished as the HTTP digest authentication. In the check levels 1 to 4, a keyword added to an HTTP request for content may be stolen and the same keyword may be illegally used. In such a case, the server may mistakenly determine that the keyword is correct. Although the server can determine whether a client is a terminal connected to the server with the IP address and authentication information with which the client requests content, the server cannot determine whether a right client that uses a false IP address or a false client accesses the server. In contrast, since the level-5 keyword uses the challenge response system in the HTTP direct authentication, the server can be prevented from a replay attack. In this case, the client shares information that can be generated by only the correct server and the correct client with a challenge value received from the server and the user name and password of the client. As the user name, public information during the DTCP authentication, for example, AKE_label or device ID, is used. As the password, a value obtained by generating a message digest with confidential information during the DTP authentication or, depending on conditions, a combination of the confidential information and public information and a challenge value received from the server is used. Since a challenge value that the server sends to a client varies in each request, a message digest value varies in each session. As a result, the check level 5 has robustness against a replay attack. In addition, it becomes difficult to identify original confidential information with the password. The check level 5 can be accomplished by combining the framework of the HTTP protocol and a parameter of the DTCP authentication.

Materials and methods for generating keywords in these check levels are listed in the following table.

TABLE 2

| CHECK LEVEL | PARAMETERS USED AS VALUES OF PARAMETERS AND THEIR GENERATION METHODS |
|---|---|
| 1 | Any character string including null character |
| 2 | Generated on the basis of public information shared during authentication. Several kinds of public information may be combined. Public information may be processed in accordance with message digest algorithm. The same value should be generated with public information shared during authentication by server and client. |
| 3 | Generated on the basis of confidential information shared during authentication in accordance with MD5 algorithm. Several kinds of confidential information may be combined. Several kinds of public information may be combined. The same value should be generated with information shared during authentication by server and client. |
| 4 | Generated on the basis of confidential information shared during authentication in accordance with SHA-1 algorithm. Several kinds of confidential information may be combined. Several kinds of public information may be combined. The same value should be generated with information shared during authentication by server and client. |
| 5 | Public information and confidential information shared during authentication are used as user name and password used in HTTP digest authentication. User name portion is generated with public information. Password portion is generated with confidential information or if necessary public information. The same value should be generated with information shared during authentication by server and client. |

When the client requests content, the client can send a plurality of keywords to the server at a time. FIG. 13 shows an example in which content is requested with two keywords in level 3 and level 4. In the example shown in FIG. 13, both a level-3 keyword "YYY" generated with a message digest in accordance with the algorithm MD5 and a level-4 keyword "ZZZ" generated with a message digest in accordance with the algorithm SHA-1 are inserted into a header portion of an HTTP request.

Message digests in the check levels 3, 4, and 5 are generated by the message digest generating blocks in the DTCP-IP authenticating blocks of the DTCP-IP compliant client and the DTCP-IP compliant server. The message digest generating blocks can obtain a confidential parameter from the AKE block. With the parameter, the message digest generating blocks generate the message digest.

According to the embodiment, as the message digest algorithms of the check levels 3 and 4, MD5 and SHA-1 are used. However, the present invention does not limit the message digest algorithms to those. Alternatively, other message digest algorithms may be used by newly defining keywords.

In a case where a message digest algorithm used in the HTTP digest authentication in the check level 5 is different from a message digest algorithm that can be used in the message digest generating block, a message digest generated by the message digest generating block is passed to an HTTP client block or an HTTP server block. Thereafter, the message digest is processed in accordance with the message digest algorithm designated in the HTTP digest authentication. As a result, the same effect can be obtained.

In a case where a client that has not been authenticated requests content, where a client that has been authenticated requests content without a keyword indicating that the client has been authenticated, or where the server does not support a keyword that a client has sent to the server, the server received the request rejects the request and sends an error response back to the client e. At this point, the server sends a check level of a keyword that the server supports back to the client.

FIG. 14 and FIG. 15 show examples of structures of HTTP responses representing keywords in any of check levels 1 to 4 that the server supports.

In the example shown in FIG. 14, a header "X-DTCP-AUTH-LEVEL"of an HTTP response rejecting a content request describes check levels of keywords that the server supports.

In the example shown in FIG. 15, in an HTTP response rejecting a content request, an identifier of a keyword is included in an HTTP option header together with a null value to show a check level that the server supports.

FIG. 16 and FIG. 17 show examples of structures of HTTP responses of which the server informs a client and that describe a level (check level 5) that the server supports. In a case where the server supports the check level 5, since it is based on the HTTP digest authentication, the status code is 401 and the server needs to send a WWW-Authenticate header to the client. The contents of the WWW-Authenticate header are the same as those in the regular HTTP digest authentication.

When the client receives the HTTP response, the client refers the status code 401 and detects that the client should be digest authenticated. The client generates a keyword in the required check level, inserts the keyword into an Authenticate header field with a digest authentication parameter described in the HTTP response, and then retries to send an HTTP request as a content request to the server.

Next, the operations of the DTCP-IP compliant client (DTCP_Sink/HTTP client) and the DTCP-IP compliant server (DTCP_Source/HTTP server) will be described in detail.

Assuming that the DTCP-IP compliant client and the DTCP-IP compliant server have been authenticated with each other, a process of transferring content will be described. Since the DTCP-IP authenticating block and the DTCP-IP content transmitting/receiving block have established respective TCP/IP connections with the server and these blocks independently perform the authentication process and the content transfer process, respectively, when the content transfer process starts, the DTCP authentication process does not always need to have been completed. Thus, the DTCP authentication process may be preformed while the content transfer process is being performed.

Figure 18:
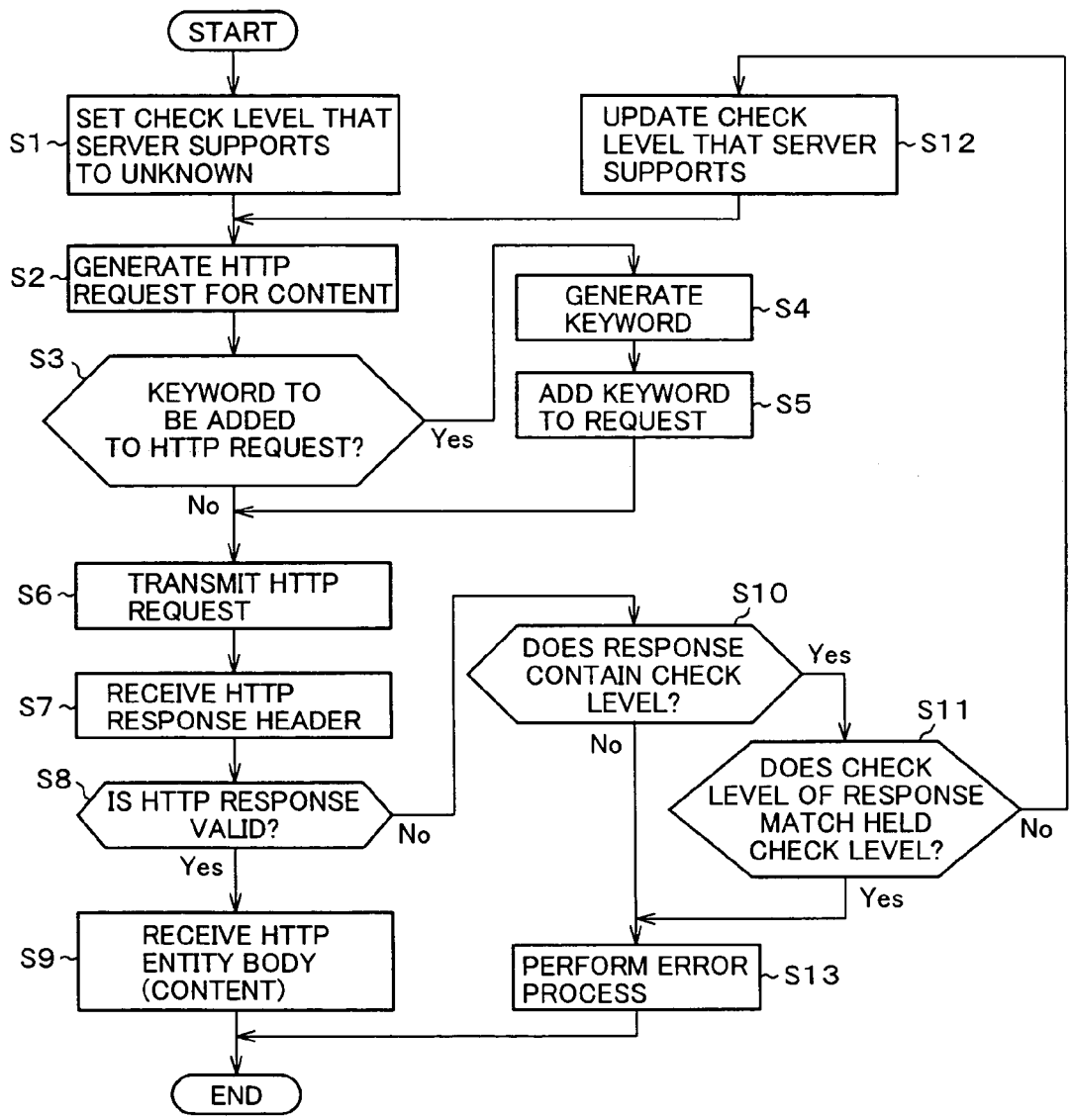
FIG. 18 is a flow chart showing a process that requests content from a server after it has authenticated a client.

FIG. 18 shows a flow chart of a process for requesting content after a client device has been authenticated. This process is executed mainly by the DTCP-IP receiving block of the client. Next, with reference to FIG. 18, this process will be described.

First, the client sets a check level that the server supports to unknown (at step S1). In a case where the client knows a check level that the server supports, the client may set the check level to the known value.

Next, the client generates an HTTP request for requesting content from the server (at step S2).

Next, it is determined whether or not a keyword is added to the HTTP request generated at step S2 (at step S3). In a case where a keyword is added to the HTTP request, the flow advances to step S4. In a case where a keyword is not added to the HTTP request, the flow advances to step S6.

At step S4, the client generates a keyword in level overlapping in a check level group of keywords that the client can generate and a check level group of keywords that the server supports. When there are a plurality of levels that overlap, the client generates a plurality of keywords. In a case where the level of a keyword that the server supports is unknown, the client generates all keywords that it can do.

The check level group of keywords that the client can generate depends on its performance that corresponds to types of message digest algorithms that the client supports or its performance restricted by the user.

Next, the keyword generated at step S4 is inserted into the HTTP request generated at step S2 (at step S5). If there are a plurality of keywords generated at step S4, all the keywords are inserted into the HTTP request.

Next, the client transmits the generated HTTP request to the server (at step S6).

Next, when the client receives an HTTP response header in response to the HTTP request transmitted at step S6 from the server (at step S7), the client determines whether the HTTP response header is a normal response (at step S8). Here, the normal response is an HTTP response having a status code 200.

If the HTTP response received from the server device is normal, the flow advances to step S9. In a case where the HTTP response is not normal, the flow advances to step S10.

At step S9, the client reads an entity body preceded by the response received at step S7. The entity body is data of encrypted content. The content decrypting block decrypts the encrypted content. The content reproducing/recording block reproduces or records the decrypted content. After the content reproducing/recording block has received and reproduced/recorded all data or when an error takes place during the process, the client completes the main routine of the process.

In a case where the HTTP response received from the server was not normal and the flow advanced to step S10, the client checks whether the response header received at step S7 contains information that represents a check level that the server supports. As described above, this information is, for example, the header "X-DTCP-AUTH-LEVEL" of the HTTP response. If the information indicating a check level is contained in the response header, the flow advances to step S11. If the information indicating a check level is not contained in the response header, the flow advances to step S13.

At step S11, the client extracts from the HTTP response header received at step S7 a check level that the server supports and determines whether the extracted check level matches the check level (of the transmitted keyword) that the client holds. In a case where a level-5 keyword is requested, the HTTP digest authentication should be performed. Thus, at step S5, the client stores data necessary for the HTTP digest authentication. In a case where the server requests the same check level that the client device holds, the flow advances to step S13. In a case where the check level that the server requests is different from the check level that the client holds, the flow advances to step S12.

As the case where the check level that the client holds is different from the check level that the server requests, a case may be included where the client has not yet completed the DTCP-IP process and does not have any keyword. In this case, before the flow advances to step S12, it is preferred that the client executes the DTCP authentication process.

At step S12, the client changes the check level that the client holds and that the server supports to the information extracted at step S11. After the client has updated the check level, the flow returns to step S2. At step S2, the client retries to request the content from the server.

At step S13, since the client cannot request the content, the client completes the main routine of the process.

Figure 19:
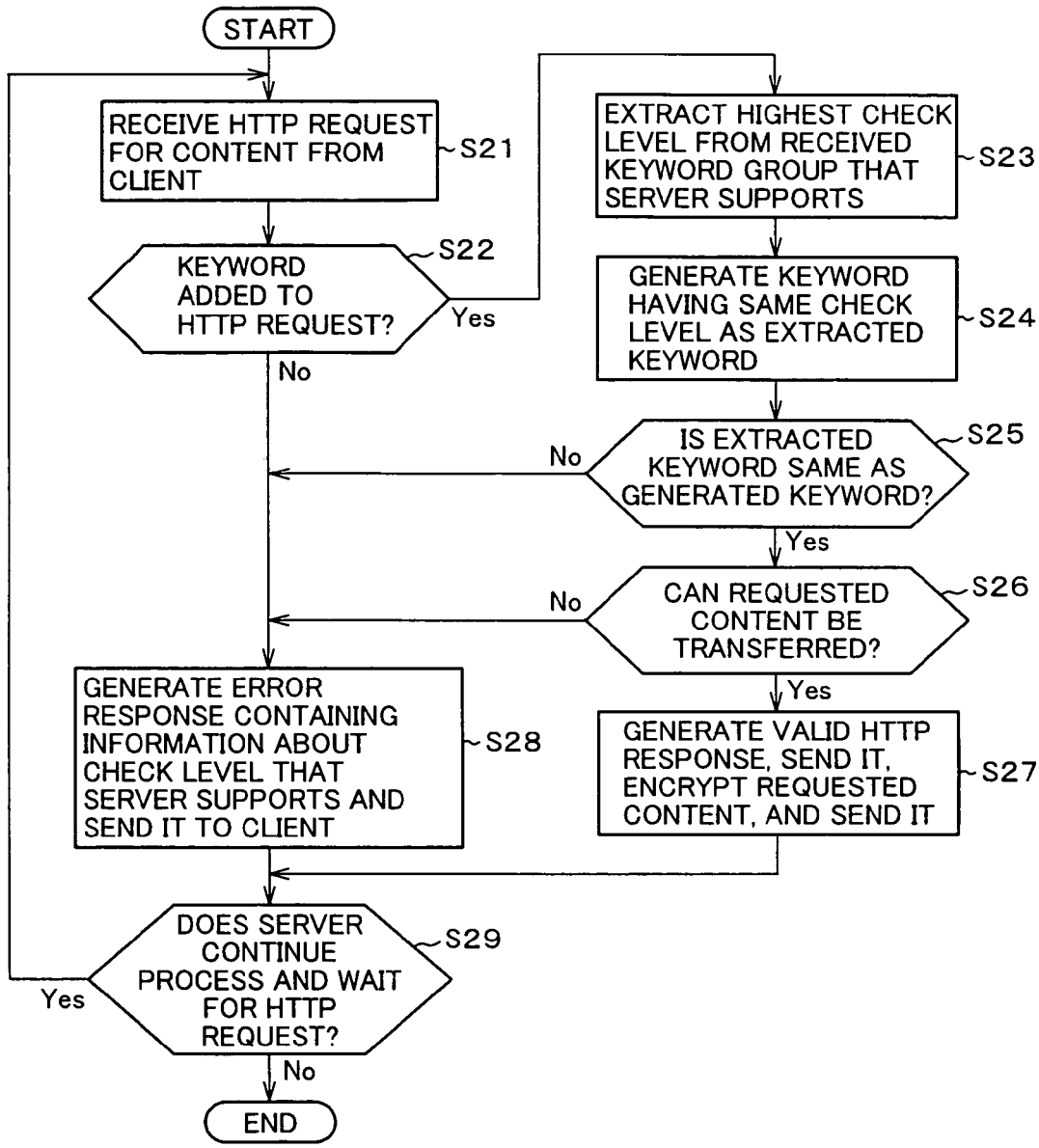
FIG. 19 is a flow chart showing a process of a server that accepts a content request from a client, checks whether the client has been DTCP authenticated with a keyword contained in the request, and transmits the content to the client that has been authenticated.

FIG. 19 shows a flow chart of a process of the server that accepts a content request from a client, determines whether the client has been DTCP authenticated with a keyword contained in the request, and transmits the content to the client that has been DTCP authenticated. This process is executed mainly by the DTCP-IP transmitting block of the server. Next, with reference to FIG. 19, this process will be described in detail.

The server receives a content request from a client (at step S21). In a case where the server accepts the request from the client, the server receives an HTTP request from the client. In a case where it takes a time for the subsequent process, the server may branch (fork) the process for the next request so that the throughput of the system increases.

Next, the server tries to extract a keyword from the received HTTP request and checks whether there is a keyword in the check level that the server supports (at step S22). In a case where the HTTP request contains a keyword in the check level that the server supports, the flow advances to step S23. In a case where the HTTP request does not contain the keyword in the check level that the server supports, the flow advances to step S28.

At step S23, the server device extracts from a keyword group in the HTTP request a keyword in the highest level that matches the check level of a keyword that the server supports.

Next, the server side generates a keyword in the check level that is the same as the keyword extracted at step S23 with data having the same attribute (for example, converts data having the same attribute into a message digest) (at step S24).

When the server generates a keyword, a parameter used during the DTCP authentication may be necessary. Thus, the server generates a keyword in association with the DTCP-IP authenticating block. However, since the level-1 keyword is composed of a flag or a character string that represents that the client has been authenticated, the server side does not need to create the level-1 keyword.

Next, the server device compares and matches the keyword extracted from the HTTP request at step S23 with the keyword that the server device has generated at step S24 and check the validity of the keyword extracted from the HTTP request (at step S25). In a case where the keyword extracted from the HTTP request matches the keyword that the server has generated, that is, the keyword is effective, the flow advances to step S26. When the keyword extracted from the HTTP request does not match the keyword that the server has generated, the flow advances to step S28. However, in a case where the check level of the keyword is 1, the flow advances to step S26 if the keyword contains an identifier, and the flow advances to step S28 if the keyword contains no identifier.

At step S26, the server checks whether the content requested from the client that has been DTCP authenticated can be transmitted. If the content can be transmitted, the flow advances to step S27. If the content cannot be transmitted, the flow advances to step S28. Here, the case where the requested content cannot be transmitted includes a case where the server side may not have the requested content or cannot access the requested content.

At step S27, the server generates an HTTP response as a normal response for the requested content and sends the HTTP response back to the client. Next, the server obtains the content that the client has requested and transmits the obtained content to the client.

In contrast, at step S28, the server generates an HTTP error response and sends it back to the client. The server inserts information about a check level that the server supports into the error response.

In a case where the flow has advanced from step S22 or step S25 and the server supports a level-5 keyword, the status code of the HTTP response is 401 as described above. In a case where the flow has advanced from step S22 or step S25 but the server device does not support the level-5 keyword, the status code of the HTTP error response is a suitable value other than 401. In a case where the flow has advanced from step S26, the server device sets a suitable status code in accordance with the HTTP protocol. For example, in a case where the server does not have the requested content, the server sets 404 (not found) as the status code, and in a case where the access to the requested content is rejected, the server sets 403 (forbidden) as the access code. However, the status code that the server sets depends on the prescription of the HTTP protocol, not directly relates to the present invention.

At step S29, the server transmits all HTTP responses. In a case where the server receives the next HTTP request, the flow advances to step S21. Otherwise, the main routine of the process is completed.

Last, a practical example of the DTCP-IP compliant client and the DTCP-IP compliant server of the content transfer system according to the embodiment transmit a content request in accordance with the HTTP protocol and send a response to the request.

FIG. 20 shows an example of a content request transmitted from the client. In the example shown in FIG. 20, the content request is described in the format of a regular HTTP request. The content request does not contain a keyword in any check level.

When the server side receives the HTTP request shown in FIG. 20, since the HTTP request contains no keyword indicating that the client has been DTCP authenticated, the server side sends an HTTP error response back to the client. FIG. 21 shows an example of the description of the HTTP error response. The server inserts a check level of a keyword that the server side supports so as to cause the client side to insert a corresponding keyword into the content request. In the example shown in FIG. 21, the HTTP error response describes the HTTP digest authentication corresponding to the check level 5 and a digest authentication parameter. In the example shown in FIG. 21, the HTTP error response is followed by information of the structure of a message screen displayed on the browser screen of the client side.

When the client side receives the HTTP error response shown in FIG. 21, the client side refers status code 401 and detects that the digest authentication should be performed. The client side generates a keyword in the requested check level, inserts the digest authentication parameter described in the HTTP response into the Authenticate Header field of the HTTP request, and transmits the HTTP request so as to retry to request the content from the server side. FIG. 22 shows an example of the description of the HTTP request. Different from the example shown in FIG. 20, in the example shown in FIG. 22, the keyword indicating that the client has been authenticated is converted into a value of an Authenticate Header field of the HTTP digest authentication.

When the server receives the HTTP request shown in FIG. 22 from the client, since the HTTP request contains a keyword in the check level that the server side requires, the server checks the validity of the keyword. In other words, the server side generates a keyword with data having the same attribute (for example, converts data into a message digest) and compares and matches the keyword contained in the HTTP with the keyword that the server side has. When the server has checked that the keyword is valid, the server sends a normal HTTP response indicating that the digest authentication has been successfully performed back to the client. FIG. 23 shows an example of the description of the normal HTTP response.

The foregoing describes the principles of the invention. Thus, it will be noted that although not explicitly described or shown herein, those skilled in the art will be able to devise various modifications that embody the principles of the invention and are within the spirit and scope of the following claims.

The embodiment of the present invention describes the structure, operation, and effects of the content transfer system based on the DTCP-IP and HTTP. However, it should be noted that the present invention is not limited to the embodiments. For example, the present invention can be applied to a content transfer system corresponding to another standard that prescribes protection of a transfer content and corresponding to a content transfer process.

In addition, a unique character string such as an HTTP option header name described in the embodiment may be composed of another character string.

According to the embodiment of the present invention, a plurality of check levels are defined for keywords. In this case, source values of keywords in any check levels should be defined when the DTCP-IP system is operated. However, the present invention does not limit source values of keywords to predetermined values.

When a client requests content from an HTTP server that is a DTCP_Source device that DTCP authenticates a plurality of clients at a time, the HTTP server should determine what DTCP authentication parameter to use. To do that, the HTTP server as the DTCP_Source device may correlatively hold DTCP authentication sessions and IP addresses of clients.

In addition, according to the embodiment of the present invention, it is determined whether a client has been authenticated with keywords contained in an HTTP request and its response. However, the present invention is not limited to this structure. Instead, when content is transferred in accordance with RTSP or RTP, the present invention can be suitably applied. In this case, RTSP is upward compatible with HTTP. Thus, all keywords in check levels 1 to 5 can be applied. In RTP, as an option of a header of RTP control protocol (RTCP), check levels 1 to 4 can be applied.

In other words, the present invention is disclosed with examples. Other principle features and advantages of the present invention will become apparent to those skilled in the art upon review of the foregoing claims.

The DTCP-IP prescribes that content be transferred in accordance with HTTP and RTP. However, HTTP is a content transfer protocol that starts with a request that contains a transfer start control. On the other hand, RTP is a protocol that does not contain controls such as transfer start and end controls. Strictly speaking, HTTP is a connection type protocol, whereas RTP is a connection-less type protocol. They depend on their characteristics and lower layer networks. HTTP is a protocol requesting content, which includes a few controls. The lower layer of HTTP is generally TCP/IP. On the other hand, RTP is a control-less type protocol that transfers content corresponding to another protocol that controls a stream. The lower layer of RTP is generally UDP/IP. In RTP, data unidirectionally flows from a sender to a receiver. However, RTP also defines a protocol named RTP Control Protocol (RTCP) that reports transmission and reception statuses (defined in RFC 1889 along with RTP). With RTCP, statuses of the sender and the receiver can be shared therewith. RTP is controlled with a protocol such as RTSP. With RTSP, precise controls for destination address, port, reproduction/stop/fast forward/rewind/slow reproduction, and so forth can be performed (they cannot be controlled with HTTP). RTSP is a HTTP based protocol that is compatible with HTTP 1.1 in messages and formats. In addition, RTSP has an interleave mode that allows RTP to be transferred. Thus, with RTSP, content can be transferred.

It should be understood by those skilled in the art that various modifications, combinations, sub-combinations and alternations may occur depending on design requirements and other factors insofar as they are within the scope of the appended claims or the equivalents thereof.

What is claimed is:

1. A content transfer system for transferring content from a content transmitting apparatus to a content receiving apparatus through an external network in consideration of content protection, said system comprising:
   authentication process executing means for executing an authentication process between said content transmitting apparatus and said content receiving apparatus and sharing authentication information therebetween; and
   content transfer process executing means for encrypting content to be transferred over the external network corresponding to a content request from said content transmitting apparatus and transferring the encrypted content from said content transmitting apparatus to said content receiving apparatus, wherein:
   said content transfer process executing means starts a transfer process for the encrypted content over the external network in response to confirmation that the content request contains a keyword indicating that the content receiving apparatus has been authenticated,
   said keyword indicating that the content receiving apparatus has been authenticated is a keyword in a check level that said content transmitting apparatus supports, the keyword being one of a plurality of types of keywords that are different in check levels representing accuracy of authentication checks, and
   said content transfer process executing means informs said content receiving apparatus of information regarding the keyword in the check level that the content transmitting apparatus supports.

2. A content transfer method for transferring content from a content transmitting apparatus to a content receiving apparatus through an external network in consideration of content protection, said method comprising:
   executing an authentication process between said content transmitting apparatus and said content receiving apparatus and sharing authentication information therebetween; and
   encrypting content to be transferred over the external network corresponding to a content request from said content transmitting apparatus and transferring the encrypted content from said content transmitting apparatus to said content receiving apparatus, wherein:
   a transfer process of the encrypted content over the external network is started in response to confirmation that the content request contains a keyword indicating that the content receiving apparatus has been authenticated,
   said keyword indicating that the content receiving apparatus has been authenticated is a keyword in a check level that said content transmitting apparatus supports, and is one of a plurality of types of keywords that are different in check levels representing accuracy of authentication checks, and
   said content receiving apparatus is informed of information regarding the keyword in the check level that the content transmitting apparatus supports.

3. A content transmitting apparatus for transferring content to a content receiving apparatus through an external network in consideration of content protection, said apparatus comprising:
   authentication process executing means for executing an authentication process with said content receiving apparatus and sharing authentication information; and
   content transfer process executing means for encrypting content to be transferred over the external network in accordance with a content request received from said content receiving apparatus and transferring the encrypted content to said content receiving apparatus, wherein:
   said content transfer process executing means starts a transfer process of the encrypted content over the external network in response to confirmation of validity of a keyword contained in the content request and indicating that the content receiving apparatus has been authenticated,
   said keyword indicating that the content receiving apparatus has been authenticated is a keyword in a check level that said content transmitting apparatus supports, and is one of a plurality of types of keywords that are different in check levels representing accuracy of authentication checks, and
   said content transfer process executing means informs said content receiving apparatus of information regarding the keyword in the check level that said content transmitting apparatus supports.

4. The content transmitting apparatus as set forth in claim 3, wherein:
   said content transmitting apparatus is an apparatus compliant with Digital Transmission Content Protection (DTCP), and
   a unique device ID and a key are embedded in said content transmitting apparatus by Digital Transmission Licensing Administrator (DTLA).

5. The content transmitting apparatus as set forth in claim 3, wherein:
   said authentication process executing means authenticates said content receiving apparatus by DTCP authentication or AKE after establishing a connection with said content receiving apparatus.

6. The content transmitting apparatus as set forth in claim 3, wherein:
   said content transfer process executing means transfers content in accordance with one of protocols HTTP, RTP, and RTSP.

7. The content transmitting apparatus as set forth in claim 3, wherein:
   said authentication process executing means and said content transfer process executing means establish respective connections between said content transmitting apparatus and said content receiving apparatus and independently execute their processes.

8. The content transmitting apparatus as set forth in claim 3, wherein:
said keyword indicating that the content receiving apparatus has been authenticated is composed of an identifier representing a check level and a keyword value corresponding to the check level.

9. The content transmitting device as set forth in claim 3, wherein:
said keyword indicating that said content receiving device has been authenticated is composed of a flag representing whether or not authentication has been performed or any character string that said content transmitting apparatus and said content receiving apparatus know.

10. The content transmitting apparatus as set forth in claim 3, wherein:
said keyword indicating that the content receiving apparatus has been authenticated is generated with at least part of information that composes said authentication information obtained by said authentication process executing means.

11. The content transmitting apparatus as set forth in claim 10, wherein:
said authentication information shared with said content receiving apparatus contains public information transferred through the network and shared with the content receiving apparatus and confidential information not transferred through the network but shared with the content receiving apparatus, and
said keyword indicating that the content receiving apparatus has been authenticated is generated on the basis of the public information contained in said authentication information.

12. The content transmitting apparatus as set forth in claim 10, wherein:
said authentication information shared with said content receiving apparatus contains public information transferred through the network and shared with the content receiving apparatus and confidential information not transferred through the network but shared with the content receiving apparatus, and
said keyword representing that the content receiving apparatus has been authenticated is generated on the basis of the confidential information contained in said authentication information.

13. The content transmitting apparatus as set forth in claim 12, wherein:
the confidential information is converted into a message digest to be used to generate the keyword.

14. The content transmitting apparatus as set forth in claim 10, wherein:
said authentication information shared with said content receiving apparatus contains public information transferred through the network and shared with the content receiving apparatus and confidential information not transferred through the network but shared with the content receiving apparatus, and
said keyword indicating that the content receiving apparatus has been authenticated is composed of data of a combination of the public information and the confidential information contained in said authentication information or data obtained by processing the public information and the confidential information.

15. The content transmitting apparatus as set forth in claim 3, wherein:
said content transmitting apparatus operates as a server apparatus transmitting content in accordance with HTTP, and
said content transfer process executing means extracts a keyword from an HTTP request requesting content and checks validity of the keyword.

16. The content transmitting apparatus as set forth in claim 15, wherein:
said keyword indicating that the content receiving apparatus has been authenticated is generated with said authentication information shared by said content transmitting apparatus and said content receiving apparatus, digest authentication information in accordance with HTTP, and information having another attribute, and
said content transfer process executing means checks whether the content receiving apparatus has been authenticated depending on whether or not the keyword generated by the content transmitting apparatus using information with the attribute and the keyword generated by the content receiving apparatus using information with the same attribute as the content transmitting apparatus are the same.

17. The content transmitting apparatus as set forth in claim 15, wherein:
said content transfer process executing means extracts a keyword from a query character string of a request URI of the HTTP request.

18. The content transmitting apparatus as set forth in claim 15, wherein:
said content transfer process executing means extracts a keyword from a header portion of the HTTP request.

19. The content transmitting apparatus as set forth in claim 15, wherein:
said keyword indicating that the content receiving apparatus has been authenticated is data generated with the authentication information obtained by said authentication process executing means and inserted into an Authenticate Header field in HTTP digest authentication.

20. The content transmitting apparatus as set forth in claim 15, wherein:
a binary keyword value is converted into character string data and inserted into a header of the HTTP request.

21. The content transmitting apparatus as set forth in claim 15, wherein:
a plurality of keywords are contained in the HTTP request at a time.

22. The content transmitting apparatus as set forth in claim 15, wherein:
said content transfer process executing means sends back an HTTP error response rejecting content transfer in a case where the received HTTP request does not contain the keyword in the check level that the content transmitting apparatus supports or where no effective keyword is ascertained.

23. The content transmitting apparatus as set forth in claim 22, wherein:
said content transfer process executing means sends back the HTTP error response in which the keyword in the check level that the content transmitting apparatus supports is embedded.

24. The content transmitting apparatus as set forth in claim 15, wherein:
in a case where the HTTP request contains a plurality of keywords, said content transfer process executing means checks validity using a keyword in a highest check level among those that the content transmitting apparatus supports.

25. The content transmitting apparatus as set forth in claim 24, wherein:
said content transfer process executing means checks whether an IP address of the content receiving apparatus that has requested content with the HTTP request is contained in the authentication information obtained by said authentication process executing means.

26. A content transmission method for transferring content to a content receiving apparatus through an external network in consideration of content protection, said method comprising:
executing an authentication process and sharing authentication information with said content receiving apparatus; and
encrypting content to be transferred over the external network in accordance with a content request received from said content receiving apparatus and transferring the encrypted content to said content receiving apparatus, wherein:
a transfer process of the encrypted content over the external network is started in response to confirmation of validity of a keyword contained in the content request and indicating that the content receiving apparatus has been authenticated,
said keyword indicating that said content receiving apparatus has been authenticated is a keyword in a check level that a content transmitting apparatus supports, and is one of a plurality of types of keywords that are different in check levels representing accuracy of authentication checks, and
said content receiving apparatus is informed of information regarding the keyword in the check level that said content transmitting apparatus supports.

27. A content receiving apparatus for receiving content transmitted through an external network in consideration of content protection, said apparatus comprising:
executing an authentication process and sharing authentication information with a content transmitting apparatus; and
content transfer process executing means for issuing a content request that contains a keyword indicating that said content receiving apparatus has been authenticated and receiving encrypted content transferred over the external network in response to the content request, wherein:
said keyword indicating that the content receiving apparatus has been authenticated is a keyword in a check level that said content transmitting apparatus supports, and is one of a plurality of types of keywords that are different in check levels representing accuracy of authentication checks, and
said content transfer process executing means obtains information regarding the keyword in the check level that said content transmitting apparatus supports.

28. The content receiving apparatus as set forth in claim 27, wherein:
said content transmitting apparatus is an apparatus compliant with DTCP, and
a unique device ID and a key are embedded in the content receiving apparatus by DTLA.

29. The content receiving apparatus as set forth in claim 27, wherein:
said authentication process executing means performs authentication with said content transmitting apparatus by DTCP authentication or AKE after establishing a connection between said content transmitting apparatus and said content receiving apparatus.

30. The content receiving apparatus as set forth in claim 27, wherein:
said content transfer process executing means transfers content in accordance with one of protocols HTTP, RIP, and RTSP.

31. The content receiving apparatus as set forth in claim 27, wherein:
said authentication process executing means and said content transfer process executing means establish respective connections between said content transmitting apparatus and said content receiving apparatus and independently execute their processes.

32. The content receiving apparatus as set forth in claim 27, wherein:
said keyword indicating that the content receiving apparatus has been authenticated is composed of an identifier representing a check level and a keyword value corresponding to the check level.

33. The content receiving apparatus as set forth in claim 27, wherein:
said keyword indicating that the content receiving apparatus has been authenticated is composed of a flag indicating whether or not authentication has been performed or any character string that said content transmitting apparatus and said content receiving apparatus know.

34. The content receiving apparatus as set forth in claim 27, wherein:
said content transfer process executing means generates said keyword indicating that the content receiving apparatus has been authenticated with at least part of information that composes the authentication information obtained by said authentication process executing means.

35. The content receiving apparatus as set forth in claim 34, wherein:
said authentication information shared between said content transmitting apparatus and said content receiving apparatus contains public information transferred through the network and shared with the content transmitting apparatus and confidential information not transferred through the network but shared with the content transmitting apparatus, and
said content transfer process executing means generates said keyword indicating that the content receiving apparatus has been authenticated on the basis of the public information contained in said authentication information.

36. The content receiving apparatus as set forth in claim 34, wherein:
said authentication information shared between said content transmitting apparatus and said content receiving apparatus contains public information transferred through the network and shared with the content transmitting apparatus and confidential information not transferred through the network but shared with the content transmitting apparatus, and
said content transfer process executing means generates said keyword indicating that the content receiving apparatus has been authenticated on the basis of the confidential information contained in said authentication information.

37. The content receiving apparatus as set forth in claim 36, wherein:
the confidential information is converted into a message digest to be used to generate the keyword.

38. The content receiving apparatus as set forth in claim 34, wherein:
said authentication information shared between said content transmitting apparatus and said content receiving apparatus contains public information transferred through the network and shared with the content transmitting apparatus and confidential information not transferred through the network but shared with the content transmitting apparatus, and
said content transfer process executing means generates the keyword composed of data of a combination of the public information and the confidential information contained in said authentication information or data obtained by processing the public information and the confidential information.

39. The content receiving apparatus as set forth in claim 27, wherein:
said content receiving apparatus operates as a client apparatus requesting content in accordance with HTTP, and
said content transfer process executing means inserts the keyword into an HTTP request.

40. The content receiving apparatus as set forth in claim 39, wherein:
said content transfer process executing means generates said keyword indicating that the content receiving apparatus has been authenticated with said authentication information shared by said content transmitting apparatus and said content receiving apparatus, digest authentication information in accordance with HTTP, and information having another attribute.

41. The content receiving apparatus as set forth in claim 39, wherein:
said content transfer process executing means inserts the keyword into a query character string of a request URI of the HTTP request.

42. The content receiving apparatus as set forth in claim 39, wherein:
said content transfer process executing means inserts the keyword into a header portion of the HTTP request.

43. The content receiving apparatus as set forth in claim 39, wherein:
said content transfer process executing means inserts, as said keyword indicating that the content receiving apparatus has been authenticated, data generated with the authentication information obtained by said authentication process executing means into an Authenticate Header field at the time of HTTP digest authentication.

44. The content receiving apparatus as set forth in claim 39, wherein:
in a case where the keyword is a binary value, said content transfer process executing means converts the keyword into character string data and inserts the character string data into a header portion of the HTTP request.

45. The content receiving apparatus as set forth in claim 39, wherein:
said content transfer process executing means is capable of inserting a plurality of keywords into the HTTP request at a time.

46. The content receiving apparatus as set forth in claim 45, wherein:
said content receiving apparatus receives from said content transmitting apparatus an HTTP error response containing a keyword in the check level that said content transmitting apparatus supports, and
in a case where said content transfer process executing means has not issued a content request that contains the keyword in the check level described in the HTTP error response, said content transfer process executing means retries to send the content request.

47. A content reception method for receiving content transmitted through an external network in consideration of content protection, said method comprising:
executing an authentication process and sharing authentication information with a content transmitting apparatus; and
issuing a content request containing a keyword indicating authentication completion and receiving encrypted content transferred over the external network in response to the content request, wherein:
said keyword indicating authentication completion is a keyword in a check level that said content transmitting apparatus supports, and is one of a plurality of types of keywords that are different in check levels representing accuracy of authentication checks, and
information regarding the keyword in the check level that the content transmitting apparatus supports is obtained.

48. A tangible computer readable medium storing a program for causing a computer system to execute a content transmission process for transferring content to a content receiving apparatus through an external network in consideration of content protection, said program comprising:
executing an authentication process and sharing authentication information with the content receiving apparatus; and
encrypting content to be transferred over the external network in accordance with a content request received from said content receiving apparatus and transferring the encrypted content to said content receiving apparatus, wherein:
a transfer process of the encrypted content over the external network is started in response to confirmation of validity of a keyword contained in the content request and indicating that the content receiving apparatus has been authenticated,
said keyword indicating that the content receiving apparatus has been authenticated is a keyword in a check level that a content transmitting apparatus supports, and is one of a plurality of types of keywords that are different in check levels representing accuracy of authentication checks, and
said content receiving apparatus is informed of information regarding the keyword in the check level that said content transmitting device supports.

49. A tangible computer readable medium storing a program for causing a computer system to execute a content reception process for receiving content transmitted through an external network in consideration of content protection, said program comprising:
executing an authentication process and sharing authentication information with a content transmitting apparatus; and
issuing a content request containing a keyword indicating authentication completion and receiving encrypted content transferred over the external network in response to the content request, wherein:
said keyword indicating authentication completion is a keyword in a check level that said content transmitting apparatus supports, and is one of a plurality of types of keywords that are different in check levels representing accuracy of authentication checks, and
information regarding the keyword in the check level that said content transmitting apparatus supports is obtained.

* * * * *